March 22, 1955  J. FRASER  2,704,619
LIQUID MEASURING AND DISPENSING APPARATUS
Filed May 3, 1951  3 Sheets-Sheet 1

INVENTOR
John Fraser
BY
ATTORNEY

March 22, 1955     J. FRASER     2,704,619
LIQUID MEASURING AND DISPENSING APPARATUS
Filed May 3, 1951     3 Sheets-Sheet 2

INVENTOR
John Fraser
BY
ATTORNEY

March 22, 1955    J. FRASER    2,704,619
LIQUID MEASURING AND DISPENSING APPARATUS
Filed May 3, 1951    3 Sheets-Sheet 3
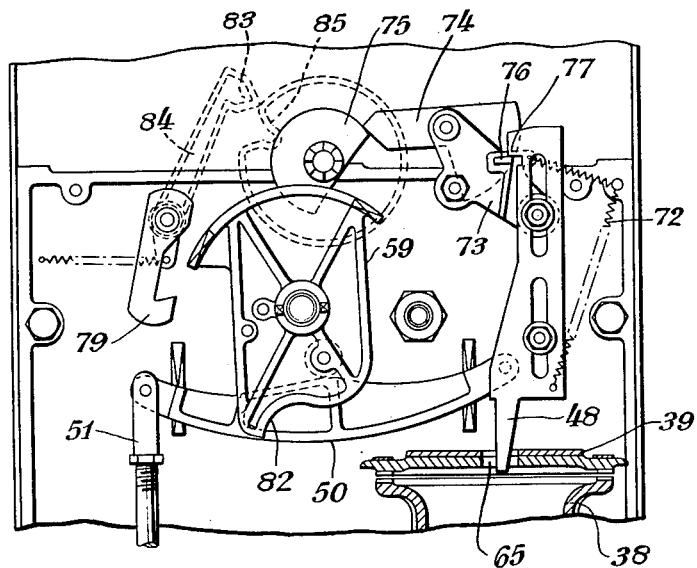
*Fig.3.*
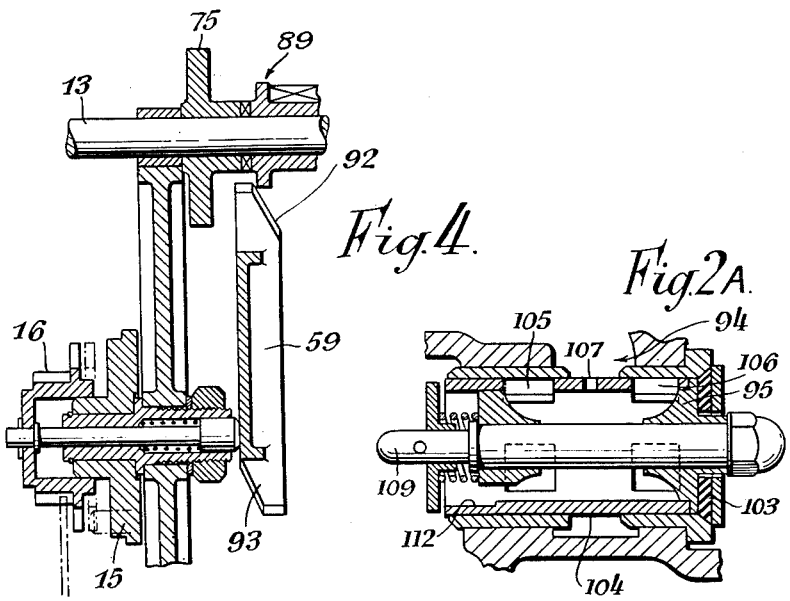
*Fig.4.*    *Fig.2A.*
INVENTOR
John Fraser
BY
ATTORNEY

United States Patent Office 2,704,619
Patented Mar. 22, 1955

2,704,619

LIQUID MEASURING AND DISPENSING APPARATUS

John Fraser, Tolworth, Surbiton, England, assignor to Avery-Hardoll Limited, Tolworth, Surbiton, England Application May 3, 1951, Serial No. 224,409

4 Claims. (Cl. 222—20)

This invention relates to liquid measuring and dispensing apparatus, and more particularly to the apparatus for this purpose commonly known as meter pumps, and used for measuring and dispensing petrol and other motor fuels.

It has been proposed to provide meter pumps which, before delivery of a quantity of liquid is started, can be set so that when the required quantity of liquid has been delivered the flow is stopped automatically by the closing of a valve between the meter which measures the liquid and the nozzle through which it is delivered, the closing of the valve, and the switching off of an electric motor driving the pump, being effected by mechanism driven by the meter and controlled as to its time of operation by the setting of the apparatus, and in which the setting is effected by manual movement of a settable member which is returned to its initial position by the movement of the meter and, when in its initial position, permits the closing of the cut-off valve and the disconnection of the settable member from the meter, the cut-off valve being opened, the clutch engaged, and the electric motor driving the pump switched on, by actuation of a common starting control such as a handle. Such meter pumps are hereinafter described as "meter pumps of the kind referred to."

According to the present invention, in a meter pump of the kind referred to, the starting control is arranged to act on a floating lever connected to the cut-off valve and motor switch, the settable member co-operating with the said floating lever, when the settable member is displaced from the zero position, to hold a point on the floating lever against displacement and thereby provide a fixed fulcrum for the floating lever about which it is moved by displacement of the starting control to open the cut-off valve and close the motor switch, the return of the settable member to zero position releasing the floating lever for movement about its connection to the starting control to permit closure of the cut-off valve and opening of the motor switch whilst the starting control remains in the starting position.

The invention is hereinafter described with reference to the accompanying drawings, in which:

Figure 2A is a longitudinal section through the cut-off valve drawn to a larger scale than Figure 2;

Figure 3 is a view similar to Figure 2 but with some parts omitted, showing the mechanism in another position; and Figure 4 is a detail.

Figure 1:
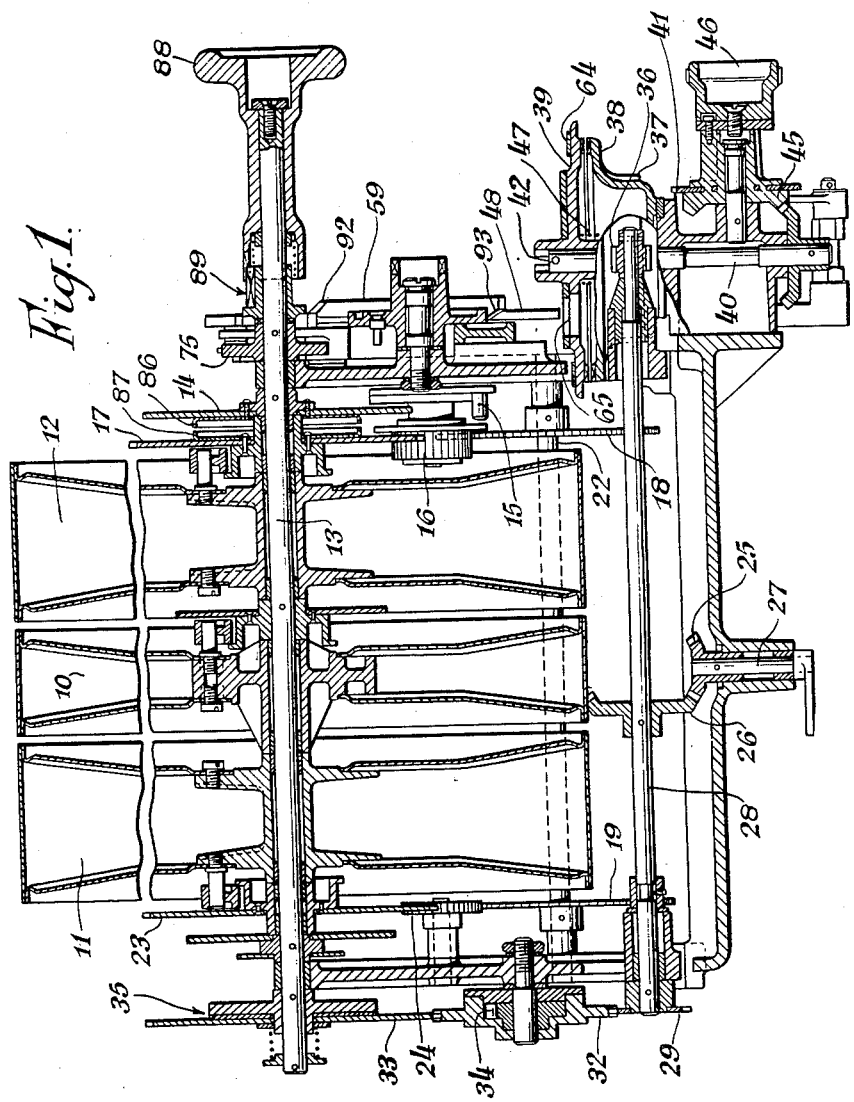
Figure 1 is a sectional side elevation of the setting, indicating and control mechanism of one form of apparatus according to the invention.

Referring to the drawings, which illustrate an indicating mechanism of the kind described in the specification of our British Patent No. 626,590, the indicating mechanism comprises three drums 10, 11 and 12 all mounted on a common shaft 13, the drum 10, hereinafter called the "fractions drum" rotating with the shaft and making one revolution for each unit quantity (e. g. gallon) of liquid delivered, and the drums 11 and 12, which are rotated at a slower rate through gearing from the shaft 13, the gearing including an intermittent gear train 14, 15, a pinion 16 driven by the intermittent gear train and meshing with a gear 17 turning with the drum 12, identical gears 18, 19 on a shaft 22, the gear 18 meshing with the pinion 16, and a gear 23, identical with the gear 17, turning with the drum 11, the gear 23 being driven from the gear 19 through an idler 24 of the same size as the pinion 16, so that the drums 11 and 12 always turn together. The common shaft 13 is driven from the liquid meter 20 through gearing including bevel pinions 25 and 26 mounted respectively on a shaft 27 coupled to the meter shaft and on an intermediate shaft 28 parallel to the common shaft 13, and a spur gear train 29, 32, 33 connecting the intermediate and common shafts, the said gear train including a uni-directional clutch 34 which prevents backward rotation of the gears, and a friction clutch 35 between the gear 33 and the common shaft 13. The intermediate shaft 28 carries a worm 36 meshing with worm teeth 37 on a member 38 which constitutes the driving member of a positive clutch the driven member 39 of which is hereinafter called "the settable member." The settable member 39 is mounted on a spindle 40 by means of a pin-and-slot connection at 42 so as to be slidable on the spindle but constrained to rotate therewith, the spindle 40 being connected by a bevel gear train 45 to a setting knob 46. A spring 47 acts normally to hold the clutch 38—39 disengaged. The knob 46 has fixed to its spindle a notched disc 41 which co-operates with a roller 41a mounted on an arm 43 and urged against the edge of the disc by a spring 44, the arrangement being such that the roller locates the settable member accurately with any one of the figures thereon opposite the index.

The settable member 39 co-operates with a peg 48 mounted for longitudinal movement and pivotally connected at 49 to one end of a floating lever 50, to the other end of which is pivotally connected a rod 51 connected at 52 to an arm 53 which in turn is connected to an electric motor switch operator 53' for controlling the supply of current to the electric motor driving the meter. The rod 51 carries a collar 54 fixed thereon to co-operate with a sliding collar 55 pivotally connected to one arm of a bell-crank lever 56 which operates the cut-off valve, this arrangement providing some initial lost motion between the rod 51 and the lever 56 during the starting operation, so that the motor is switched on during the time in which the cut-off valve is opened, and is switched off after the cut-off valve has closed.

The floating lever 50 is provided with a flat surface 57 on one side which co-operates with a roller 58 on a starting control member 59 rocking about a centre at 62, the starting control being manipulated by a handle (not shown) outside the casing of the apparatus. A spring 63 acts on the rod 51 to urge it in an upward direction, movement of the rod in this direction being limited by a stop built into the motor switch.

The settable member 39 comprises a disc marked at 64 with figures representing unit quantities of liquid to be delivered, a window being provided in the casing of the apparatus through which the figures are viewed. The plane of the settable member 39 is perpendicular to the direction of movement of the peg 48, and the disc is formed with a hole 65 which, when the zero marking on the settable member is in register with an index mark, is in line with the peg.

The peg 48 is slotted at 66 and 67, and slides on two studs 68 and 69, being urged upwardly away from the settable member 39 by a spring 72 which is weaker than the spring 63. The stud 68 serves as a pivot for an arm 73 on which is mounted a pawl 74, and the common shaft 13 carries a cam 75 which, except when the drum 10 is in the zero position, limits inward movement of the pawl 74. The arm 73 has on it a projection 76 which lies in the path of a nose 77 integral with the peg 48, and so prevents the full downward movement of the peg until the drum 10 is in its zero position. A spring 78 urges the pawl 74 away from the cam 75.

A latch 79 is provided which prevents the starting control member 59 from being moved to switch on the motor until the indicating mechanism has been set to zero, the latch being permitted to move clear of a nose 82 on the member 59 when the drums are in the zero position by the movement of a nose 83 on a lever 84 into notches 85 on two discs 86 and 87 rotating respectively with the shaft 13 and the drum 12.

The drums are zeroised by rotating the common shaft 13, a knob 88 being provided which is loose on the shaft when the member 59 is moved to switch on the motor, but is coupled to the shaft by a clutch 89 when the member is in the "off" position. The clutch is controlled by a ramp 92 on the member 59, a second ramp 93 on the said member serving to disengage the pinion 16 from the driven member 15 of the intermittent gearing when the clutch 89 is engaged, so as to render the intermittent gearing ineffective. The arrangement for turning the drums 11 and 12 during zeroising is the same as that described in our prior British patent specification No. 626,590 above referred to.

Figure 2:
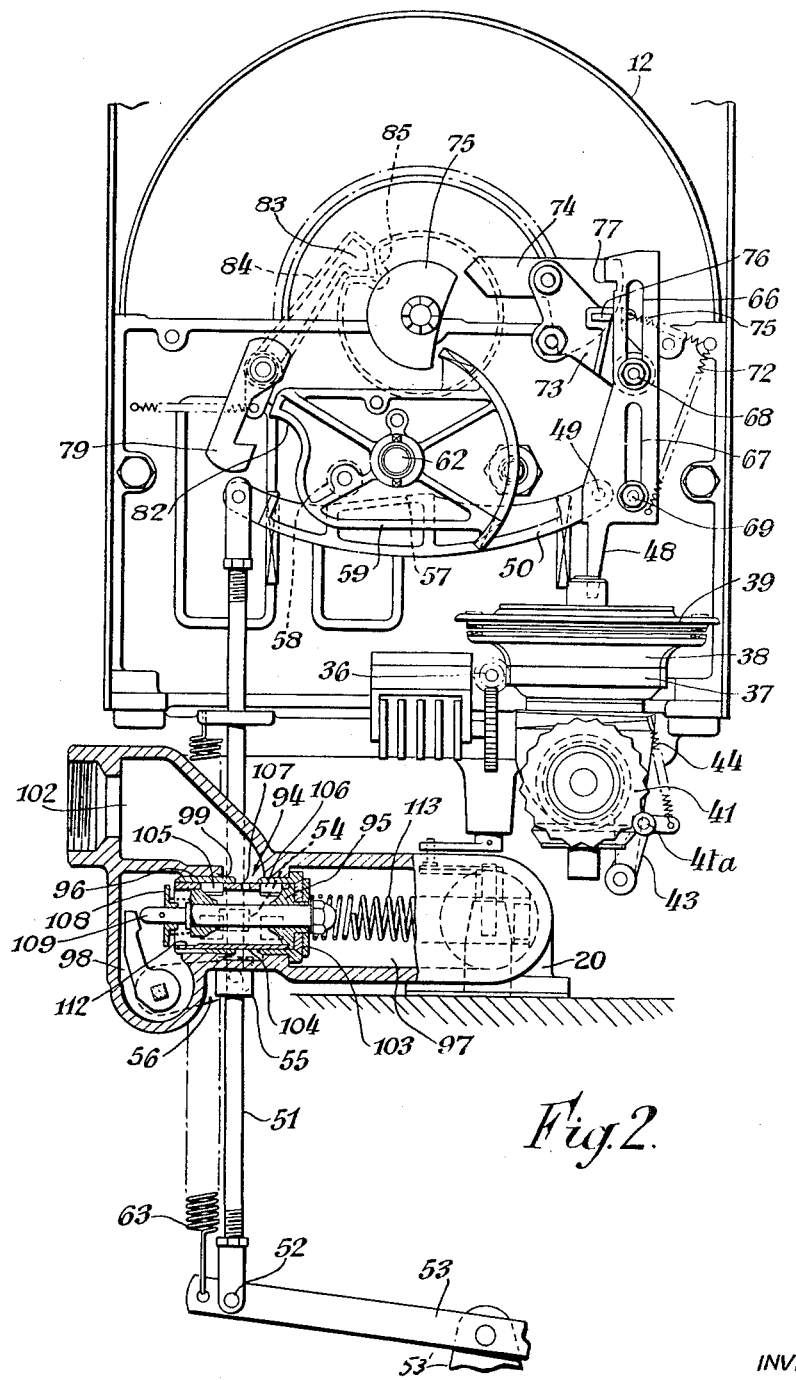
Figure 2 is an end elevation of the mechanism shown in Figure 1.

The cut-off valve is indicated generally by the reference 94, in Figure 2, and is shown on an enlarged scale in Figure 2A. The cut-off valve comprises a valve member 95 slidable in a fixed sleeve 96 which opens at one end into the meter outlet passage 97, at the other end into a closed chamber 98, and has lateral ports 99 leading into the delivery passage 102, to which the delivery pipe (not shown) is connected. The valve member 95 has a mushroom head 103 which seats, when the valve is closed, on the inlet end of the sleeve 96, and a ported sleeve 104 having ports 105, 106 which provide a free passage for liquid from the meter to the delivery line when the valve is open, the liquid flowing into the sleeve 96 from the outlet passage 97 through the ports 106, and out again to the delivery passage 102 through the ports 105. A small port 107 is also provided which is open to the delivery passage 102 when the valve is partially closed and the ports 105 are no longer open, the liquid then entering the sleeve 96 through the ports 106 and leaving through the port 107, so that the flow is restricted. A disc 108 slidable on a spindle 109 passing through the valve is spring-urged away from the end of the ported sleeve of the valve member which opens into the chamber 98, and tends to seat on the end of the ported sleeve during the first part of the closing movement of the valve to trap liquid in the chamber 98 and thus damp the movement of the valve. A leakage path is provided at 112 to nullify the damping action on the valve after its first closing movement has taken place. The valve member is urged towards the closed position by a spring 113.

It will be seen that when the parts are in the position shown in Figure 2, the starting control member 59 being in the off position, the rod 51 is held by the spring 63 in a position defined by the limit of travel of the motor switch and the peg 48 is held up by the spring 72 so as to be clear of the settable member. The settable member is thus disengaged from the clutch driving member 38, and can be rotated by means of the knob 46.

If, after the settable member has been moved away from the zero position, the starting control member 59 is turned to the position shown in Figure 3, the central portion of the floating lever 50 is pushed downwardly. As the spring 63 is stronger than the spring 72, the peg 48 first moves downwardly until its lower end engages the settable member 39 and presses it down, thus engaging the clutch 38, 39 and the rod 51 then commences to move downwardly opening the cut-off valve and operating the motor switch. The subsequent return of the settable member to the zero position brings the hole 65 opposite to the peg, permitting the floating lever 50 to be rocked by the spring 63 in the direction to close the cut-off valve and stop the motor.

The apparatus operates in the following manner. When it is desired to deliver liquid through the meter pump, the drums 10, 11 and 12 are turned to zero by the knob 88 and the settable member 39 is set by means of the knob 46 to the number of gallons required.

The starting control member 59 is then moved from the position shown in Figure 2 to the position shown in Figure 3, urging the peg 48 against the settable member 39, opening the cut out valve, and closing the motor switch as described in the last preceding paragraph. The settable member 39 is thus clutched to the intermediate shaft 28, and the pumping of liquid is commenced. The hosecock on the delivery end of the hose is then opened, and liquid flows therethrough until, during delivery of the last unit quantity, the rotation of the settable member 39 brings the hole 65 into line with the peg 48, and the peg 48 is urged into the hole 65 by the spring 63, which acts to rock the lever 50 about the roller 58. At this stage of the delivery, however, the fractions drum 10 is not reading zero, and the pawl 74, which is rocked by the downward movement of the peg 48 to the position shown in Figure 3, engages the periphery of the cam, and limits the downward movement of the peg. The cut-off valve is therefore only partly closed, and slow delivery of liquid can still take place by way of the ports 106, 107, the ports 105 which, with the ports 106, provided the flow path for normal delivery, being closed. Delivery continues at the reduced rate until the drum 10 reaches its zero position, when the pawl 74 rides into the cut-away portion of the cam 75, and permits the peg to complete its downward movement, thus permitting the spring 63 to move the rod 51 upwardly until it has completely closed the cut-off valve and opened the motor switch to stop the motor. As soon as this occurs the delivery of liquid ceases, the hosecock being provided with the known valve arrangement including a valve which closes automatically when the pressure in the hose falls.

The return of the starting control member 59 to the position shown in Figure 2 permits the peg 48 to rise clear of the settable member 39. This movement of the member 59 also engages the clutch 89 between the zeroising knob 88 and the common shaft 13, and disconnects the pinion 16 from the driven member 15 of the intermittent gear, so placing the mechanism in condition for zeroising. As previously explained, the latch 79 prevents the starting control member from again being turned to the starting position until the indicator drums have been zeroised.

The cut-off valve may be of any suitable type adapted for closing in two stages, the particular form shown being merely one example of a suitable valve.

I claim:

1. Control mechanism for a liquid measuring and dispensing apparatus comprising a motor switch operating means, a meter for measuring the liquid dispensed, a cut-off valve for terminating the dispensing operation, a floating lever, means connecting said floating lever to the cut-off valve and to the switch operating means for operation by said floating lever, resilient means acting on said connecting means to urge the switch operating means to the open position and the cut-off valve to the closed position, a starting control, a manually settable member for setting the control mechanism to zero, a movable fulcrum member, a fulcrum on said fulcrum member for said floating lever, and means for driving said settable member from the meter, said settable member when displaced from a zero position, acting to hold said movable fulcrum member against movement and thereby temporarily fix the fulcrum thereon for the floating lever, said starting control acting to move the floating lever about said temporarily fixed fulcrum to close the switch operating means and open the cut-off valve, and said settable member, upon returning to its zero position, releasing said movable fulcrum member to allow movement of the fulcrum, the resulting movement of the floating lever closing the cut-off valve and actuating the switch operating means.

2. Control mechanism for a liquid measuring and dispensing apparatus, comprising a motor switch operating means, a meter for measuring the liquid dispensed, a cut-off valve for terminating the dispensing operation, a floating lever, means connecting one end of said floating lever to the cut-off valve and to the switch operating means for operation by said floating lever, resilient means acting on said connecting means to urge the switch operating means to the open position and the cut-off valve to the closed position, a starting control, a manually settable member for setting the control mechanism to zero, a peg, means guiding said peg for rectilinear movement, a fulcrum on said peg for the other end of said floating lever, and means for driving said settable member from the meter, said settable member having an aperture positioned to receive the peg when the settable member is in a zero position, and, when displaced from the zero position, acting to hold said peg against movement and thereby temporarily fix the fulcrum thereon for the floating lever, said starting control acting to move the floating lever about said temporarily fixed fulcrum to close the switch operating means and open the cut-off valve, and the said settable member, upon returning to its zero position, receiving the peg into the aperture therein to allow movement of the fulcrum, the resulting movement of the floating lever closing the cut-off valve and actuating the switch operating means.

3. Control mechanism for a liquid measuring and dispensing apparatus, comprising a motor switch operating means, a meter for measuring the liquid dispensed and a cut-off valve for terminating the dispensing operation, a floating lever, means connecting said floating lever to the cut-off valve and to the switch operating means for operation by said floating lever, resilient means acting on said connecting means to urge the switch operating means to the open position and the cut-off valve to the closed position, a starting control, a manually settable member for setting the control mechanism to zero, a setting knob, gear means connecting said setting knob permanently to said settable member, a gear train for driving said settable member from the meter, a positive clutch in said gear train engaged by the operation of the starting control through the floating lever, a movable fulcrum member, a fulcrum on said fulcrum member for said floating lever, and means for driving said settable member from the meter, said settable member, when displaced from a zero position, acting to hold said movable fulcrum member against movement and thereby temporarily fix the fulcrum thereon for the floating lever, said starting control acting to move the floating lever about said temporarily fixed fulcrum to close the switch operating means and open the cut-off valve, and said settable member, upon returning to its zero position, releasing said movable fulcrum member to allow movement of the fulcrum, the resulting movement of the floating lever closing the cut-off valve and actuating the switch operating means.

4. Control mechanism for a liquid measuring and dispensing apparatus, comprising a motor switch operating means, a meter for measuring the liquid dispensed, a cut-off valve for terminating the dispensing operation, a floating lever, means connecting said floating lever to the cut-off valve and to the switch operating means for operation by said floating lever, resilient means acting on said connecting means to urge the switch operating means to the open position and the cut-off valve to the closed position, a starting control, a manually settable member for setting the control mechanism to zero, a movable fulcrum member, a fulcrum on said fulcrum member for said floating lever, means for driving said settable member from the meter, said settable member, when displaced from a zero position, acting to hold said movable fulcrum member against movement and thereby temporarily fix the fulcrum thereon for the floating lever, said starting control acting to move the floating lever about said temporarily fixed fulcrum to close the switch operating means and open the cut-off valve, and said settable member, upon returning to its zero position, releasing said movable fulcrum member to allow movement of the fulcrum, the resulting movement of the floating lever closing the cut-off valve and actuating the switch operating means, an indicating mechanism for showing the quantity of liquid delivered, means for driving said indicating mechanism from the meter, means for zeroising said indicating mechanism, said last mentioned means including a zeroising knob, and a clutch through which movement of said knob is transmitted to the indicating mechanism, and means carried by said starting control to disengage said clutch when the starting control is moved to start delivery of liquid.

References Cited in the file of this patent

UNITED STATES PATENTS

| | | |
|---|---|---|
| 1,948,984 | Granberg | Feb. 27, 1934 |

FOREIGN PATENTS

| | | |
|---|---|---|
| 615,776 | Great Britain | Jan. 11, 1949 |